July 17, 1956  J. L. UNDERWOOD, JR  2,755,046
AIRCRAFT FUEL LOAD EQUALIZING SYSTEM
Filed Oct. 25, 1954
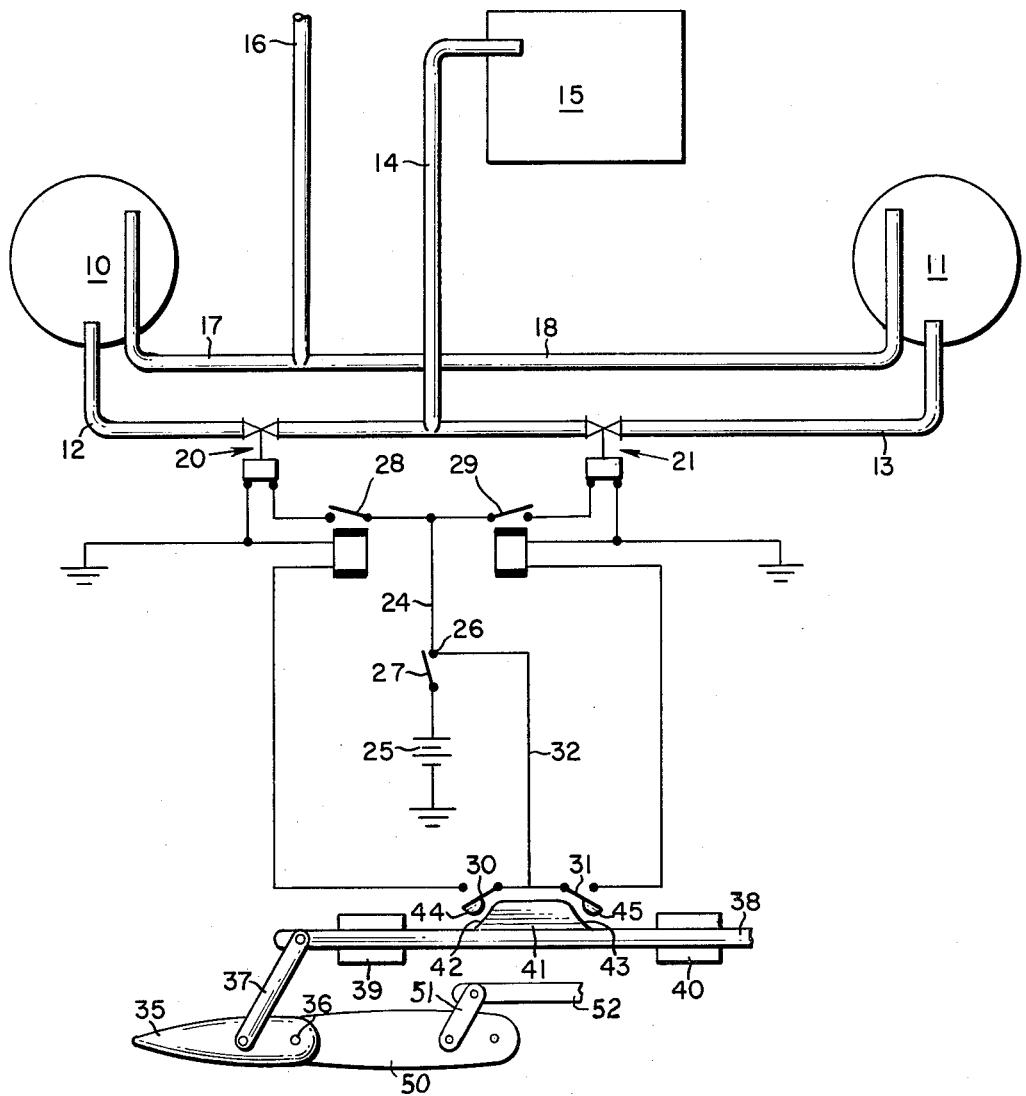
INVENTOR
JOHN L. UNDERWOOD, JR.
BY
ATTORNEYS ns
2,755,046

AIRCRAFT FUEL LOAD EQUALIZING SYSTEM

John L. Underwood, Jr., Corpus Christi, Tex.

Application October 25, 1954, Serial No. 464,660

7 Claims. (Cl. 244—135)

(Granted under Title 35, U. S. Code (1952), sec. 266)

The invention described herein may be manufactured and used by or for the Government of the United States of America for governmental purposes without the payment of any royalties thereon or therefor.

The present invention relates to an aircraft fuel load equalizing system and more particularly to such a system employing an interconnection between the trim tab members of an aircraft and means which controls the flow of fuel from the fuel tanks of the aircraft.

The invention system is particularly adapted for use in aircraft utilizing auxiliary wing tip fuel tanks or fuel tanks disposed within the wing adjacent the wing tip. In such aircraft, malfunctions frequently occur in the fuel feed system causing a tank on one side of the longitudinal axis of the aircraft to empty faster than a tank on the other side thereof. The resulting difference in weight of the fuel tanks causes the aircraft to become unbalanced about the longitudinal axis thereof, creating a hazardous condition which is particularly dangerous at slow speeds as for instance when landing the aircraft.

As a fuel load unbalance occurs during flight, the pilot of the aircraft subconsciously adjusts the aileron trim tabs to relieve stick pressures resulting from the unequal loading. The apparent wing heaviness is not noticeable to the pilot until the trim tabs are at the limit of their movement at which time a dangerous unbalance already exists. In order to safely land the aircraft or even approach landing speeds when one wing tip tank is substantially heavier than the other, the pilot must either jettison one or both tanks, or jettison the fuel from the tanks. Either of these alternatives is expensive and undesirable.

Since the aileron trim tabs are adjusted to compensate for wing heaviness, the deflection of the aileron trim tabs is a measure of the wing heaviness as caused by an unequal fuel distribution. The present invention provides an interconnection between the aileron trim tabs and means which controls the flow of fuel from the fuel tanks whereby predetermined movement of the trim tabs automatically compensates for unequal flow of fuel form the tanks.

An object of the present invention is the provision of a new and novel aircraft fuel load equalizing system which senses unequal fuel loads in wing tip or outer wing fuel tanks.

Another object is to provide a fuel load equalizing system which maintains a substantially equal flow of fuel from the tanks of the aircraft to obtain an equal fuel load in each wing.

A further object of the invention is the provision of a fuel load equalizing system which is simple and inexpensive in construction, yet sensitive and reliable in operation.

Other objects and many of the attendant advantages of this invention will be readily appreciated as the same becomes better understood by reference to the following detailed description when considered in connection with the accompanying drawing which shows a diagrammatic view of a preferred embodiment of the invention.

Referring now to the drawing, oppositely disposed wing tip tanks 10 and 11 are respectively connected by means of fuel feed conduits 12 and 13 to a common conduit 14 which is in turn connected to the main fuel tank 15 of the aircraft. A source of air pressure (not shown) is connected to a conduit 16 connected to conduits 17 and 18 which respectively open into tanks 10 and 11 thereby providing a means for forcing the fuel from the tanks into conduits 12 and 13.

Solenoid valves 20 and 21 which are normally de-energized and biased to open position are inserted in conduits 12 and 13 respectively whereby the flow through these conduits may be selectively interrupted. A source of electrical energy such as a battery 25 is connected to a terminal 26 through a switch 27. The switch 27 is located in the cockpit of the aircraft such that the pilot may selectively deactivate the circuit when he desires.

Relays 28 and 29 are each provided with a conventional coil and armature arrangement, suitable means being provided to maintain the armatures in open position as shown in the drawing such that the circuit through lead 24 and the solenoid valves is normally open whereby the fuel flow through conduits 12 and 13 is uninterrupted. Switches 30 and 31 are also connected to terminal 26 by means of lead 32. The switches are normally biased to open position by suitable means and are adapted when closed in a manner hereinafter described to respectively actuate relays 28 and 29 and consequently cause the flow of fuel through conduits 12 and 13 to be interrupted.

A conventional aileron trim tab 35 is pivotally mounted at 36 upon an aileron 50 of the aircraft and has a link 37 pivotally secured thereto. Aileron 50 has a link 51 pivotally secured thereto and the opposite end of link 51 is pivotally connected to an arm 52 secured to suitable linkage extending to the cockpit of the aircraft whereby the pilot can selectively actuate aileron 50. The opposite end of link 37 is pivotally connected to an arm 38 which is slidably mounted in guide members 39 and 40 which are supported within the wing of the aircraft. Arm 38 is connected to a suitable linkage extending to the cockpit of the aircraft whereby the pilot may selectively actuate trim tab 35. A cam member 41 is secured to arm 38 and has oppositely sloping cam surfaces 42 and 43 formed thereon. Cam surfaces 42 and 43 are adapted to engage cooperating cam followers 44 and 45 which are respectively secured to switches 30 and 31. Upon pivotal movement of trim tab 35 and corresponding longitudinal movement of arm 38, cam 41 is adapted to close one of switches 30 and 31 thereby actuating either relay 28 or 29 and interrupting the flow of fuel through one of conduits 12 or 13.

The operation of the invention system is as follows:

Assuming that trim tab 35 is mounted upon the aileron in the left wing of an aircraft and that the right wing tip tank 11 is heavier than the left wing tip tank 10, the pilot will actuate arm 38 to the left as shown in the drawing causing tab 35 to be displaced in a downward direction. Such deflection of the trim tab will cause the left aileron to be raised thereby tending to lower the left wing and compensate for the right wing heaviness.

As arm 38 moves to the left, cam surface 42 engages cam follower 44 and closes switch 30 whereupon relay 28 is actuated and valve 20 is closed. This interrupts the flow of fuel from tank 10 while the flow of fuel in tank 11 remains uninterrupted such that tank 11 continues to empty thereby relieving the unbalanced condition of the fuel load. When tank 11 weighs substantially the same amount as tank 10, the heaviness of the right wing will no longer exist and the pilot will subconsciously readjust trim tab 35 to its original position. Switch 30 will then be opened allowing valve 20 to open and fuel to flow from tank 10 through conduit 12 to the main fuel tank. A similar sequence of operation will occur in the opposite direction should the left wing tip tank become heavier than the right wing tip tank. In this manner, the fuel flow from the faster feeding tank is interrupted, and the slower feeding tank is given an opportunity to empty to the same degree as the other tank.

The invention has been described as utilized in a system wherein a pressurized gas is employed to force the fuel from the fuel tanks. A system may also be employed eliminating pressure sources and substituting pumps for valves 20 and 21. In such a case, the pumps would be normally operating and would be shut off upon actuation of the associated relay. For example, if the right wing were heavier than the left wing and tab 35 were accordingly deflected downwardly, the pump corresponding to valve 20 would be shut off while the pump corresponding to valve 21 would continue to operate and balance out the fuel load. It is apparent that an additional fuel line and pump may also be actuated by the control circuit to aid in balancing of the fuel load.

The mechanical linkage disclosed for actuating tab 35 is for the purpose of illustration only, and it is obvious that any suitable conventional mechanical linkage may be employed for actuating the trim tab as long as cam member 41 is actuated thereby to control switches 30 and 31. Cam 41 may be dimensioned such that switches 30 and 31 are closed upon movement of arm 38 to compensate for a wing heaviness on the order of 100 pounds.

Cam member 41 may preferably be adjustably secured to arm 35 such that the relative longitudinal position of these members may be selectively adjusted. With such an arrangement, it is possible for the pilot to trim the aircraft to compensate for any wing heaviness due to causes other than an unbalanced fuel loading. When such an adjustment has been made, cam member 41 is placed in its neutral position midway between cam followers 44—45, and member 41 is fixedly secured to member 38. Subsequent operation of the trim tab upon the occurrence of an unbalanced fuel loading will cause switches 30 and 31 to be alternately closed as previously described.

It is apparent from the foregoing that there is provided a new and novel aircraft fuel load equalizing system which senses unequal fuel loads in an aircraft and which maintains a substantially equal fuel flow from the tanks to obtain an equal fuel loading. The device is simple and inexpensive in construction and yet is sensitive and reliable in operation.

Obviously many modifications and variations of the present invention are possible in the light of the above teachings. It is therefore to be understood that within the scope of the appended claims the invention may be practiced otherwise than as specifically described.

I claim:

1. In an aircraft, a fuel load equalizing system which comprises a plurality of fuel tanks disposed on opposite sides of the longitudinal axis of said aircraft, fuel flow control means for controlling the flow of fuel from said tanks, aileron members mounted in the wings of said aircraft, auxiliary trim tab control surfaces pivotally mounted on said aileron members, means for operating said aileron members, means for operating said auxiliary control surfaces independently of said aileron members, and means for actuating said flow control means upon predetermined movement of said auxiliary control surfaces.

2. In an aircraft, a fuel load equalizing system which comprises a plurality of fuel tanks disposed on opposite sides of the longitudinal axis of said aircraft, fuel feed conduits connected to said tanks, fuel flow control means in each of said conduits for controlling the flow of fuel from said tanks, aileron members mounted in the wings of said aircraft, trim tab members pivotally mounted on said aileron members, means for operating said aileron members, means for operating said trim tab members independently of said aileron members, and means connected to said operating means for actuating said flow control means in response to predetermined movement of said operating means.

3. In an aircraft, a fuel load equalizing system which comprises a plurality of fuel tanks disposed adjacent the wing tips of said aircraft, a main fuel tank, fuel feed conduits connecting each of said plurality of tanks with said main fuel tank, fuel flow control means in each of said conduits for controlling the flow of fuel from said tanks, means for forcing the fuel from said tanks, aileron members pivotally mounted in the wings of said aircraft, trim tab members pivotally mounted on said aileron members, means for operating said aileron members, means for operating said trim tab members independently of said aileron members, and means connected to said operating means for actuating said flow control means in response to predetermined movement of said operating means.

4. In an aircraft, a fuel load equalizing system which comprises a plurality of fuel tanks disposed on opposite sides of the longitudinal axis of said aircraft, fuel feed conduits connected to said tanks, fuel flow control means in each of said conduits for controlling the flow of fuel from said tanks, aileron members mounted in the wings of said aircraft, trim tab members pivotally mounted on said aileron members, means for operating said aileron members, means for operating said trim tab members independently of said aileron members, an electrical control circuit for energizing said flow control means, said circuit including a source of power and switch means, and cam means connected to said operating means for automatically actuating said switch means upon predetermined movement of said operating means.

5. In an aircraft, a fuel load equalizing system which comprises a plurality of fuel tanks disposed adjacent the wing tips of said aircraft, a main fuel tank, fuel feed conduits connecting each of said plurality of tanks with said main fuel tank, fuel flow control means in each of said conduits for controlling the flow of fuel from said tanks, means for forcing the fuel from said tanks, aileron members pivotally mounted in the wings of said aircraft, trim tab members pivotally mounted on said aileron members, means for operating said aileron members, means for operating said trim tab members independently of said aileron members, an electrical control circuit for energizing said flow control means, said circuit including a source of power, relay means for actuating said fuel control means, switch means connected to said source and said relay means, selectively operable means for deactivating said circuit, and cam means connected to said operating means for automatically actuating said switch means upon predetermined movement of said trim tab members.

6. Apparatus as defined in claim 5 wherein said fuel flow control means comprises a plurality of valve means.

7. Apparatus as defined in claim 5 wherein said fuel flow control means includes a plurality of pump means.

References Cited in the file of this patent

UNITED STATES PATENTS

| 1,266,029 | Lehman | May 14, 1918 |
| 1,574,567 | Flettner | Feb. 23, 1926 |
| 2,124,867 | Akerman | July 26, 1938 |
| 2,509,629 | DeGiers | May 30, 1950 |
| 2,514,888 | McFarland | July 11, 1950 |
| 2,585,480 | Makhonine | Feb. 12, 1952 |